United States Patent [19]

Mittelhäuser

[11] Patent Number: 4,711,421

[45] Date of Patent: Dec. 8, 1987

[54] SUPPORT FOR EXTERNAL REARVIEW VEHICULAR MIRROR

[76] Inventor: Bernhard Mittelhäuser, Am Krähenberg, D-3002 Wedemark 2, Fed. Rep. of Germany

[21] Appl. No.: 922,720

[22] Filed: Oct. 24, 1986

[30] Foreign Application Priority Data

Oct. 29, 1985 [DE] Fed. Rep. of Germany ....... 8530609

[51] Int. Cl.⁴ ............................................. G02B 5/08
[52] U.S. Cl. .................................... 248/479; 350/632
[58] Field of Search ..................... 248/466, 475.1, 476, 248/479, 480, 485, 486, 487, 220.2, 221.3, 324; 350/604, 632, 635

[56] References Cited

U.S. PATENT DOCUMENTS

| | | | |
|---|---|---|---|
| 2,949,058 | 8/1960 | Daly | 248/479 |
| 3,404,935 | 10/1968 | Creager | 248/486 |
| 4,380,370 | 4/1983 | Mittelhauser | 248/475.1 |
| 4,592,529 | 6/1986 | Suzuki | 248/475.1 |
| 4,606,619 | 8/1986 | Yamana | 248/486 |
| 4,636,045 | 1/1987 | Suzuki | 350/632 |
| 4,657,362 | 4/1987 | Suzuki | 350/632 |

FOREIGN PATENT DOCUMENTS

| | | | |
|---|---|---|---|
| 1132815 | 7/1962 | Fed. Rep. of Germany | 248/479 |
| 2324452 | 11/1974 | Fed. Rep. of Germany | 248/479 |
| 2857557 | 7/1980 | Fed. Rep. of Germany | 350/635 |
| 2857556 | 8/1980 | Fed. Rep. of Germany | 350/635 |
| 3136840 | 3/1983 | Fed. Rep. of Germany | 350/635 |
| 3220893 | 12/1983 | Fed. Rep. of Germany | 350/635 |
| 2565175 | 12/1985 | France | 350/632 |
| 12453 | 1/1986 | Japan | 350/631 |
| 2071035 | 9/1981 | United Kingdom | 350/635 |

*Primary Examiner*—J. Franklin Foss
*Assistant Examiner*—Robert A. Olson
*Attorney, Agent, or Firm*—Becker & Becker, Inc.

[57] ABSTRACT

A support for an external rearview mirror of a motor vehicle. The support serves for fastening of the mirror to the vehicle. A mirror housing, in which is disposed a mirror body, is pivotably connected to the support, via a bracket, in such a way that the mirror housing can be tilted in the longitudinal direction of the vehicle. The support is also provided with a releasable arresting mechanism for holding the mirror body or the mirror housing in its effective position. Also provided is a one-piece metallic member formed of a metal plate and, connected thereto, a pivot connection part for the bracket, the arresting mechanism, and means for mounting the support to the vehicle. A molded plastic member substantially surrounds the metallic member and determines the external appearance of the support. This molded plastic member is provided with catches for connecting the metallic member to the plastic member.

3 Claims, 1 Drawing Figure

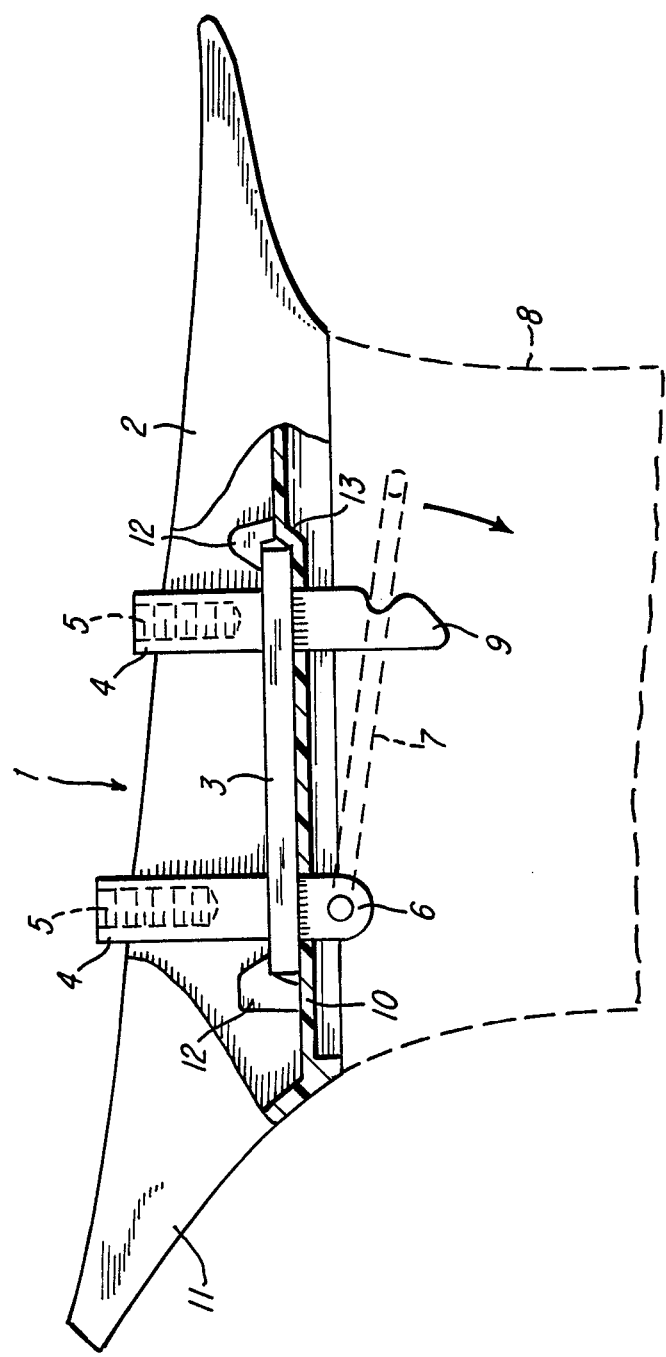

SUPPORT FOR EXTERNAL REARVIEW VEHICULAR MIRROR

BACKGROUND OF THE INVENTION

The present invention relates to a support for an external rearview mirror of a motor vehicle. The support serves for fastening of the mirror to the vehicle. A mirror housing, in which is disposed a mirror body, is pivotably connected to the support, via bracket means, in such a way that the mirror housing can tilt in the longitudinal direction of the vehicle. The support is also provided with a releasable arresting mechanism for holding the mirror body or mirror housing in its effective position.

With heretofore known mirrors of this general type, the support is a one-piece molded plastic member, the construction of which is relatively complicated, and which for reasons of strength must have substantial dimensions.

It is an object of the present invention to improve a mirror of the aforementioned general type in such a way that the strength of the support can be considerably increased without thereby making the construction and the assembly of the support more complicated.

BRIEF DESCRIPTION OF THE DRAWING

This object, and other objects and advantages of the present invention, will appear more clearly from the following specification in conjunction with the accompanying schematic drawing, which is a partially sectioned plan view of one exemplary inventive embodiment of a support for an external rearview vehicular mirror.

SUMMARY OF THE INVENTION

The support of the present invention is characterized primarily by a one-piece metallic member, and by a molded plastic member that substantially surrounds the metallic member and determines the external appearance of the support, with the metallic member being formed of a metal plate and, connected thereto, a pivot connection part for the bracket means, the arresting mechanism, and means for mounting the support to a vehicle, and with the molded plastic member being provided with catch means for connecting the metallic member to the molded plastic member.

The significant thing is that a single, complete metallic member, has a single structure, comprises all of the aforementioned elements. In other words, the metallic member is formed with these elements, in order thus on the one hand to assure a stable mounting, and on the other hand to rigidly and securely connect the pivot connection part and the arresting mechanism with the aforementioned plate. The combination of the metallic member with the molded plastic member causes no difficulties due to the fact that pursuant to the present invention catch means (snap connections) are provided. Thus, the connection of these parts can be effected very rapidly.

Further specific features of the present invention will be described in detail subsequently.

DESCRIPTION OF PREFERRED EMBODIMENTS

Referring now to the drawing in detail, the inventive support is made in two parts. Disposed approximately in the center is a metallic member 1 that is surrounded by a molded plastic member 2.

The metallic member 1 predominantly comprises a sturdy metal plate 3 that has an approximately square or rectangular cross-sectional shape. When the mirror is installed and assembled, the metal plate 3 is disposed approximately vertically. Located on the back side of the metal plate 3 are mounting pins 4 that are provided with an internal thread 5 into which mounting screws can be screwed. Located on the opposite side of the metal plate 3 is a pivot connection part 6 for a metal bracket 7 that is indicated by dashed lines only in that, in the customary manner, permits pivoting of the mirror housing 8 under certain operating conditions. An arresting mechanism 9 is furthermore securely attached. Two successively arranged arresting mechanisms could also be provided for the mirror housing 8, which is illustrated in the effective position.

The metallic body 1 rests against the back of a base plate 10 of the support, i.e. of the molded plastic member 2. Proceeding from the base plate 10 are cover-like walls 11 that form a streamlined transition from the mirror body or mirror housing 8 to the vehicle. The edges of the metal plate 3 are held by hook-like catches 12 of the base plate 10 in order to thus provide a connection between the metal plate 3 and the base plate 10. To effect assembly, the metal plate 3 is pressed onto the base plate 10, whereby the hook-like catches 12 assume the fastening position shown in the drawing. In order to achieve an even better positive connection between the metal plate 3 and the base plate 10, the latter can additionally be provided with one or more steps or shoulders 13 against which an edge or edges of the metal plate 3 can rest.

With the inventively configured support, the attachment and holding forces are all absorbed and transmitted by the metallic member 1. There results a stable, secure holding, and a straightforward possiblity for connecting the metallic plate 3 to the molded plastic member 2 of the support.

The present invention is, of course, in no way restricted to the specific disclosure of the specification and drawing, but also encompasses any modifications within the scope of the appended claims.

What I claim is:

1. A support for an external rearview mirror for a motor vehicle, whereby said support serves for fastening of said mirror to said vehicle, and whereby a mirror housing, in which is disposed a mirror body, is pivotably connected to said support, via bracket means, in such a way that said mirror housing can tilt in the longitudinal direction of said vehicle; said support is also provided with a releasable arresting mechanism for holding said mirror body or mirror housing in its effective position; said support comprises:

a one-piece metallic member formed of a metal plate and, connected to the latter, said arresting mechanism, a pivot connection part for said bracket means, and means for fastening said support to said vehicle; and a molded plastic member that substantially surrounds said metallic member and determines the external appearance of said support, with said molded plastic member being provided with catch means for connecting said metallic member with said molded plastic member.

2. A support according to claim 1, in which said molded plastic member is provided with a base plate, against which said metal plate of said metallic member rests; and in which said catch means is in the form of hook-like elements that are disposed on said base plate and extend around edge portions of said metal plate.

3. A support according to claim 1, in which said molded plastic member is provided with a base plate that has at least one shoulder, with edge portions of said metal plate resting against said at least one shoulder.

* * * * *